: US008431282B2

United States Patent
Herrmann

(10) Patent No.: US 8,431,282 B2
(45) Date of Patent: Apr. 30, 2013

(54) CLOSED COOLANT LOOP WITH EXPANSION DEVICE FOR A FUEL CELL SYSTEM

(75) Inventor: Manfred Herrmann, Ginsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 1907 days.

(21) Appl. No.: 11/735,253

(22) Filed: Apr. 13, 2007

(65) Prior Publication Data

US 2008/0254328 A1 Oct. 16, 2008

(51) Int. Cl.
*H01M 8/04* (2006.01)

(52) U.S. Cl.
USPC ........... 429/437; 429/433; 429/434; 429/436; 429/438

(58) Field of Classification Search ................ 429/17, 429/433, 434, 436, 437, 438
See application file for complete search history.

(56) References Cited

U.S. PATENT DOCUMENTS

| 5,503,944 | A * | 4/1996 | Meyer et al. ................ 429/437 |
| 6,379,827 | B1 * | 4/2002 | Cipollini ..................... 429/429 |
| 6,428,916 | B1 * | 8/2002 | Grasso et al. ............... 429/410 |
| 2003/0162066 | A1 * | 8/2003 | Shiraishi et al. ............ 429/26 |
| 2006/0068250 | A1 * | 3/2006 | Bai et al. ..................... 429/26 |
| 2007/0160881 | A1 * | 7/2007 | Ukai et al. ................... 429/22 |

* cited by examiner

*Primary Examiner* — Basia Ridley
*Assistant Examiner* — Sean P Cullen
(74) *Attorney, Agent, or Firm* — John A. Miller; Miller IP Group, PLC

(57) ABSTRACT

A fuel cell system that employs a closed coolant loop. The system includes an expansion device having a flexible membrane, where a cooling fluid side of the membrane is in fluid communication with the cooling fluid in the coolant loop and an air side of the membrane is in communication with an air pocket. The air side of the expansion device is in air communication with an air compressor so that the pressure of the cooling fluid within the coolant loop changes as the stack pressure changes. The fuel cell system also includes a coolant reservoir that is in fluid communication with the cooling fluid in the coolant loop. Air and hydrogen bubbles within the cooling fluid are vented to the coolant reservoir where they accumulate. The coolant reservoir includes a level sensor indicating the level of the cooling fluid therein.

10 Claims, 2 Drawing Sheets

CLOSED COOLANT LOOP WITH EXPANSION DEVICE FOR A FUEL CELL SYSTEM

BACKGROUND OF THE INVENTION

1. Field of the Invention

This invention relates generally to a closed coolant loop for a fuel cell stack in a fuel cell system and, more particularly, to a closed coolant loop for a fuel cell stack in a fuel cell system, where the system includes an expansion device having a flexible membrane.

2. Discussion of the Related Art

Hydrogen is a very attractive fuel because it is clean and can be used to efficiently produce electricity in a fuel cell. A hydrogen fuel cell is an electro-chemical device that includes an anode and a cathode with a polyelectrolyte therebetween. The anode receives hydrogen gas and the cathode receives oxygen or air. The hydrogen gas is dissociated at the anode to generate free protons and electrons. The protons pass through the electrolyte to the cathode. The protons react with the oxygen and the electrons at the cathode to generate water. The electrons from the anode cannot pass through the electrolyte, and thus are directed through a load circuit to perform work before being sent to the cathode.

Proton exchange membrane fuel cells (PEMFC) are a popular fuel cell for vehicles. A PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and membrane define a membrane electrode assembly (MEA).

Many fuel cells are typically combined in a fuel cell stack to generate the desired power. The fuel cell stack receives a cathode input gas, typically a flow of air forced through the stack by a compressor. Not all of the oxygen in the air is consumed by the stack and some of the air is output as a cathode exhaust gas that may include water as a stack by-product. The fuel cell stack also receives an anode hydrogen input gas that flows into the anode side of the stack.

The fuel cell stack includes a series of bipolar plates positioned between the several MEAs in the stack. The bipolar plates include an anode side and a cathode side for adjacent fuel cells in the stack. Anode gas flow channels are provided on the anode side of the bipolar plates that allow the anode gas to flow to the MEA. Cathode gas flow channels are provided on the cathode side of the bipolar plates that allow the cathode gas to flow to the MEA. The bipolar plates are made of a conductive material, such as stainless steel, so that they conduct the electricity generated by the fuel cells out of the stack. The bipolar plates also include flow channels through which a cooling fluid flows.

It is necessary that a fuel cell operate at an optimum relative humidity and temperature to provide efficient stack operation and durability. The temperature provides the relative humidity within the fuel cells in the stack for a particular stack pressure. Excessive stack temperature above the optimum temperature may damage fuel cell components, reducing the lifetime of the fuel cells. Also, stack temperatures below the optimum temperature reduce the stack performance.

Fuel cell systems employ thermal sub-systems that control the temperature within the fuel cell stack. Particularly, a cooling fluid is pumped through the cooling channels in the bipolar plates in the stack. The known thermal sub-systems in the fuel cell system attempt to control the temperature of the cooling fluid being sent to the fuel cell stack and the temperature difference between the cooling fluid into the stack and the cooling fluid out of the stack, where the cooling fluid flow rate controls the temperature difference. Typically the cooling fluid is a liquid that inhibits corrosion within the stack, does not freeze in cold environments, and is non-conductive. One example of a suitable cooling fluid is a de-ionized water and glycol mixture. It is necessary that the cooling fluid be non-conductive so that current does not travel across the cooling fluid channels in the stack.

SUMMARY OF THE INVENTION

In accordance with the teachings of the present invention, a fuel cell system is disclosed that employs a closed coolant loop. The system includes an expansion device having a flexible membrane, where a cooling fluid side of the membrane is in fluid communication with the cooling fluid in the coolant loop and an air side of the membrane is in communication with an air pocket. As the cooling fluid within the cooling loop expands and contracts, the membrane will flex accordingly. The air side of the expansion device can be in fluid communication with an air compressor providing air to the cathode side of the stack so that the pressure of the cooling fluid within the coolant loop changes as the stack pressure changes.

The fuel cell system also includes a coolant reservoir that is in fluid communication with the cooling fluid in the coolant loop through a ventilation line, where the reservoir is completely filled with cooling fluid. Air bubbles and hydrogen bubbles within the cooling fluid are vented to the coolant reservoir where they accumulate. The coolant reservoir includes a level sensor indicating the level of the cooling fluid therein so that the accumulated air and hydrogen can be vented to the environment at the appropriate time.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a fuel cell system having a closed coolant loop is merely exemplary in nature, and is in no way intended to limit the invention or its applications or uses.

Figure 1:
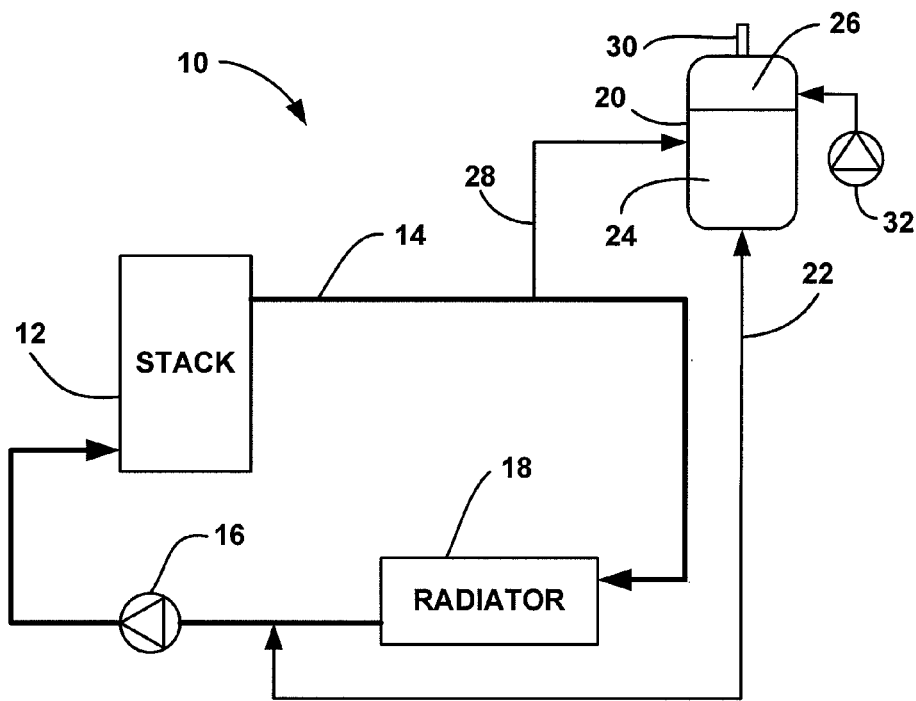
FIG. 1 is a schematic plan view of a fuel cell system including a coolant reservoir.

FIG. 1 is a schematic plan view of a fuel cell system 10 including a thermal sub-system for providing cooling fluid to a fuel cell stack 12. The cooling fluid that flows through the stack 12 flows through a coolant loop 14 outside of the stack 12 where it either provides heat to the stack 12 during start-up or removes heat from the stack 12 during fuel cell operation to maintain the stack 12 at a desirable operating temperature, such as 60° C.-80° C. A pump 16 pumps the cooling fluid through the coolant loop 14, and a radiator 18 cools the cooling fluid in the loop 14 outside of the stack 12. The system 10 includes a coolant reservoir 20 that holds extra cooling fluid 24, and is typically positioned at the highest location in the coolant loop 14. An air pocket 26 provides a compressible region within the reservoir 20. As the temperature and the pressure of the cooling fluid within the coolant loop 14 changes, the cooling fluid is forced into the reservoir 20 or is taken from the reservoir 20 on line 22.

Hydrogen is a very light gas and is difficult to contain within an enclosed environment. It is known in the art that hydrogen can permeate through stack and plate materials within the fuel cell stack 12, especially around the plates of the stack 12. Hydrogen leaks into the cooling fluid channels where it is dissolved in the cooling fluid or is trapped in the cooling fluid as hydrogen bubbles.

The impeller of the pump 16 creates cavitation, which produces air bubbles that are trapped in the coolant loop 14. The system 10 includes a ventilation line 28 that allows the air bubbles to be removed from the coolant loop 14 and enter the reservoir 20. In addition to the air bubbles, the hydrogen bubbles that are trapped within the cooling fluid are also vented to the reservoir 20, where they accumulate in the air pocket 26. This accumulation of hydrogen within the reservoir 20 in combination with the air is a combustible source that could ignite.

It is necessary to periodically remove the hydrogen from the air pocket 26 to remove the combustion source. It is known to provide an air pump 32 that pumps air into the air pocket 26, where the existing air/hydrogen mixture within the air pocket 26 is vented from the reservoir 20 through an outlet pipe 30. This operation removes the hydrogen from the reservoir 20, while maintaining the necessary air pocket 26. However, by continually pumping air into the reservoir 20 the cooling fluid 24 within the reservoir 20 becomes contaminated with dirt and the like. Also, the air from the pump 32 causes some of the cooling fluid 24 to evaporate, which requires that the reservoir 20 be filled from time to time. Further, the pump 32 has to be heated so that it does not freeze in sub-zero environments. Also, the cooling fluid will degrade as a result of contact with oxygen. Further, the ventilation system requires complex electrical systems to guarantee the operation of the system for safety purposes. Additionally, because the coolant reservoir 20 is open to the environment, there will be pressure differences between the anode and the cathode of the stack 12 relative to the coolant loop 14 that could reduce the lifetime of the stack 12.

Figure 2:
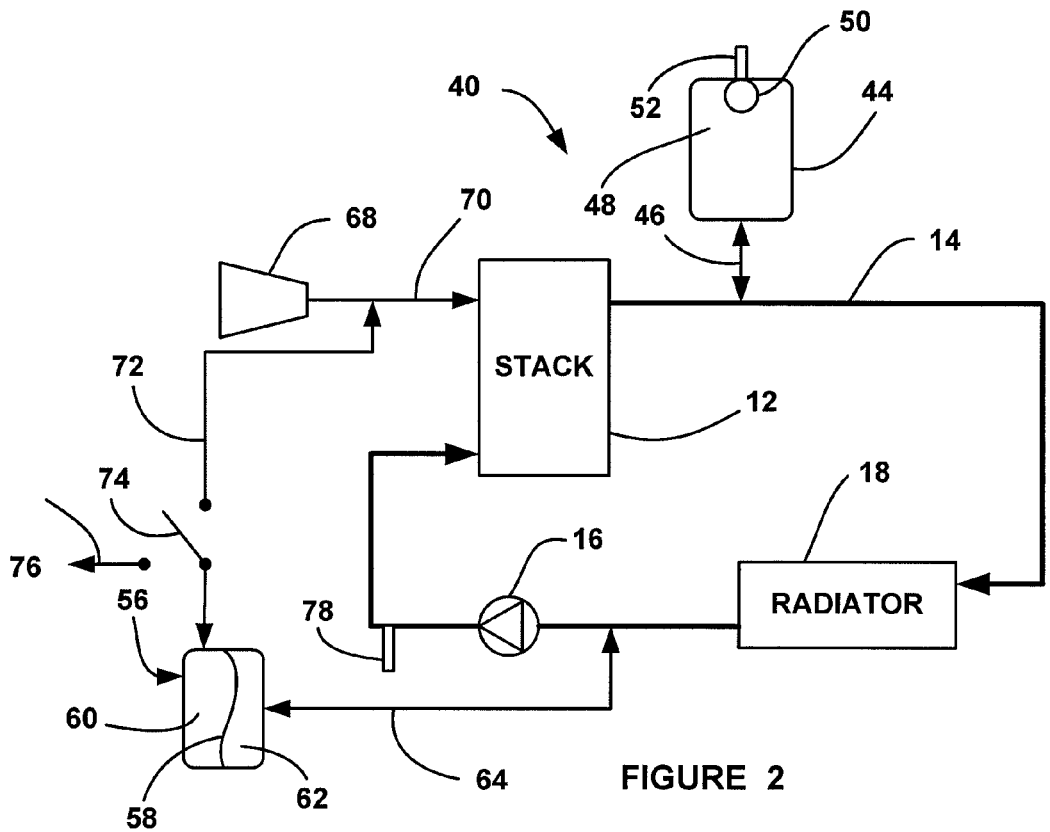
FIG. 2 is a schematic plan view of a fuel cell system employing an expansion device and a completely filled coolant reservoir for providing a closed coolant loop, according to an embodiment of the present invention.

FIG. 2 is a schematic plan view of a fuel cell system 40 including a closed coolant loop, where like elements to the system 10 are identified with the same reference numeral. The system 40 includes a coolant reservoir 44 that is in fluid communication with the coolant loop 14 through a refill and ventilation 46. As will be appreciated by those skilled in the art, the diameter of the line 46 will need to be sufficient for proper operation. According to the invention, the coolant reservoir 44 is completely filled with a cooling fluid 48. A level sensing device 50 is positioned within the coolant reservoir 44. The level sensing device 50 can be any suitable device that indicates the level of the cooling fluid 48 within the reservoir 44 consistent with the discussion herein. Air bubbles and hydrogen bubbles in the coolant loop 14 are vented through the line 28 and accumulate within the reservoir 44. The level sensing device 50 will indicate that the level of the cooling fluid 48 therein has decreased. The level sensing device 50 can provide a signal that causes a vent port 52 to open to vent the accumulated air and hydrogen and to the environment in a safe manner. The amount of the accumulated gas should be very low so as to prevent gas ignition.

In one embodiment, the device 50 is a float ball positioned relative to the vent port 52 that closes the vent port 52 when the reservoir 44 is completely filled with the cooling fluid 48. As the air and hydrogen accumulate at the top of the reservoir 44, the float ball 50 drops with the level of the cooling fluid 48 and the port 52 is opened to the environment venting the accumulated air and hydrogen. The amount of the accumulated gas should be very low so as to prevent gas ignition.

In another embodiment, the level sensing device 50 operates as a gas release valve that automatically opens the vent port 52 only when the vehicle is traveling above a certain speed so that hydrogen accumulated therein is safely dispersed to the environment.

Also, the level sensing device 50 acts as a hydrogen leak detector. If a significant leak of hydrogen occurs in the stack 12, then the accumulated hydrogen within the coolant reservoir 44 will be more rapid than under normal operating conditions, which can be detected by the level sensing device 50.

According to the invention, the system 40 includes an expansion device 56 having a flexible membrane 58. The expansion device 56 includes an air side 60 on one side of the membrane 58 and a cooling fluid side 62 on the other side of the membrane 58. The coolant loop 14 is in fluid communication with the cooling fluid side 62 of the device 56 on line 64. As the temperature of the cooling fluid within the coolant loop 14 increases and decreases and the cooling fluid expands and contracts in response thereto, the cooling fluid will enter and leave the cooling fluid side 62 of the expansion device 56, causing the membrane 58 to flex against the air side 60 to provide the expansion and contraction.

In one embodiment, the system 40 includes an air compressor 68 that provides compressed air on line 70 to the cathode side of the stack 12. Depending on the demanded load on the stack 12, the compressor 68 will deliver compressed air to the stack 12 typically between one and four bar, which changes the pressure within the stack 12. As the pressure on the cathode side of the stack 12 increases in response to the stack load, a pressure differential is created within the stack 12 between the cathode flow channels and the cooling fluid flow channels. According to this embodiment of the invention, the compressor 68 is coupled to the air side 60 of the expansion device 56 on an air input line 72 so that as the air pressure applied to the stack 12 increases or decreases from the compressor 68, this pressure is transferred to the cooling fluid within the coolant loop 14 through the membrane 58.

Further, cavitation as a result of operation of the impeller of the pump 16 could damage components within the system 40. As the load on the stack 12 goes up, the cooling fluid speed needs to increase, which is provided by an increased speed of the pump 16. By providing an increased pressure from the compressor 68 to the air side 60 of the expansion device 56 as the stack load goes up, the pressure within the coolant loop 14 will increase, which will reduce the cavitation.

Because hydrogen is a thin gas, it is possible that dissolved hydrogen within the cooling fluid on the cooling fluid side 62 of the expansion device 56 could permeate through the membrane 58, depending on its thickness and material, into the air side 60. Therefore, hydrogen may accumulate on the air side 60 of the expansion device 56, possibly providing a potential combustion source. By coupling the air side 60 of the expansion device 56 to the air input line 70, and periodically changing the pressure within the air side 60 by the compressor 68, air will periodically flow from the air side 60 of the expansion device 56 to the line 70, reducing the possibility of accumulated hydrogen therein.

A three-way valve 74 can be provided in the line 72 to couple the air side 60 of the expansion device 56 to an external line 76 to allow external pressurization of the coolant loop 14 for maintenance and testing purposes.

Further, the coolant loop 14 can include a filling valve 78 to allow the cooling system to be easily filled.

Figure 3:
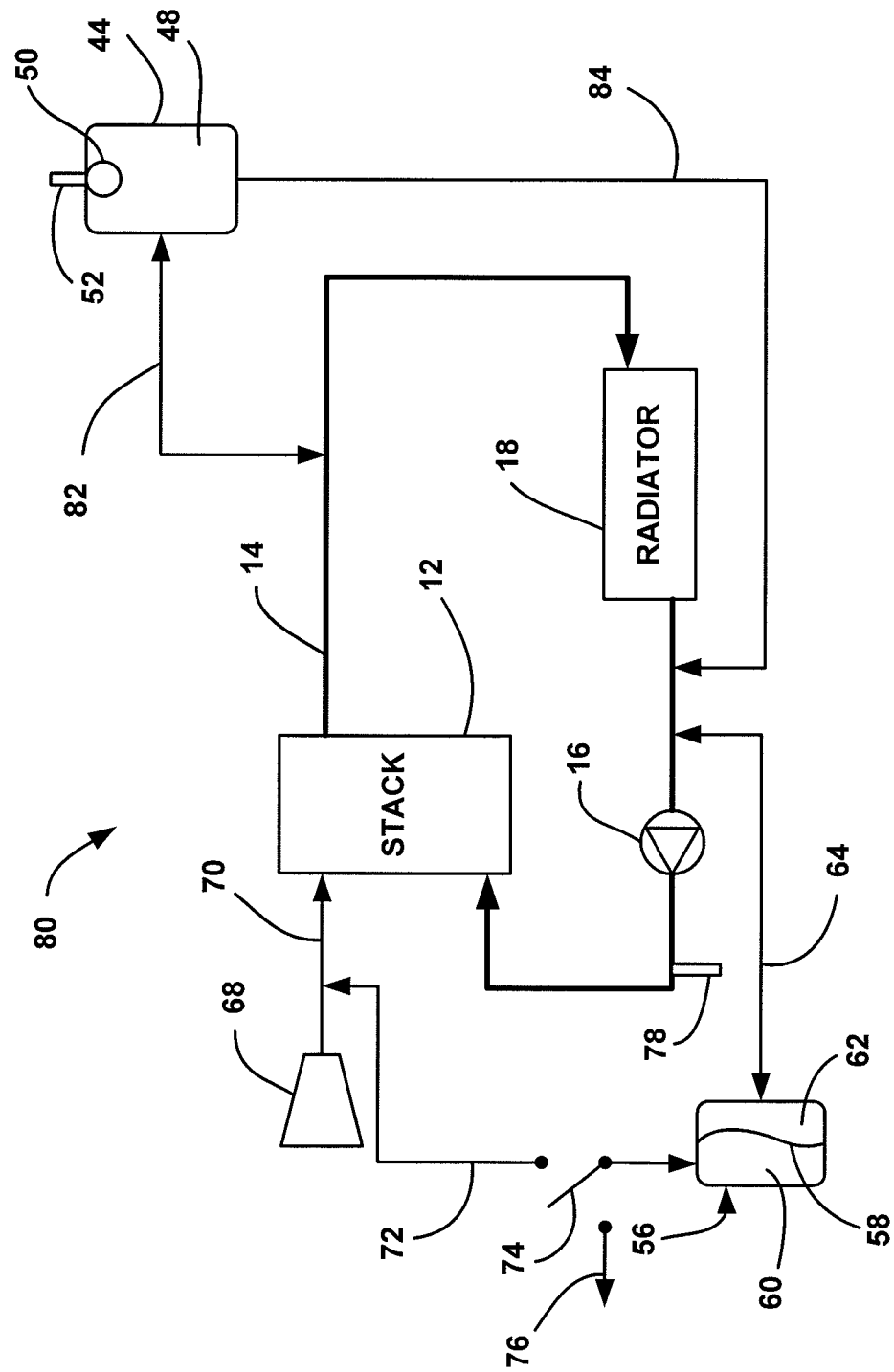
FIG. 3 is a schematic plan view of a fuel cell system employing an expansion device and a completely filled coolant reservoir for providing a closed coolant loop, according to another embodiment of the present invention.

FIG. 3 is a schematic plan view of a fuel cell system 80 employing an expansion device and a completely filled coolant reservoir for providing a closed coolant loop, according to another embodiment of the present invention, where like elements to the systems 10 and 40 are identified by the same reference numeral. In this embodiment, the a ventilation line 82 and a refill line 84 are coupled to the reservoir 44.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
   a fuel cell stack;
   a coolant loop for providing a cooling fluid to the stack; and
   a coolant reservoir in fluid communication with the coolant loop, said coolant reservoir being completely filled with the cooling fluid, said coolant reservoir including a level sensing device that senses the level of the cooling fluid within the coolant reservoir and vents accumulated gas from the coolant reservoir if the level of the cooling fluid in the coolant reservoir decreases.

2. The fuel cell system according to claim 1 wherein the level sensing device includes a float, said float closing a port of the reservoir when the reservoir is completely filled with the cooling fluid and allowing gas to ventilate through the port when the level of the cooling fluid within the reservoir decreases.

3. The fuel cell system according to claim 1 wherein the level sensing device is an electrical switch device that opens a ventilation port of the reservoir in response to vehicle speed.

4. A fuel cell system comprising:
   a fuel cell stack;
   a coolant loop for providing a cooling fluid to the stack;
   a coolant loop pump for pumping the cooling fluid through the coolant loop and the fuel cell stack;
   a coolant reservoir in fluid communication with the coolant loop, said coolant reservoir being completely filled with the cooling fluid, said coolant reservoir including a level sensing device that senses the level of the cooling fluid within the reservoir and vents accumulated gas from the coolant reservoir if the level of the cooling fluid in the coolant reservoir decreases; and
   an expansion device including a membrane, an air side on one side of the membrane and a cooling fluid side on an opposite side of the membrane, said cooling fluid side being in fluid communication with the coolant loop, wherein the membrane flexes in response to pressure changes of the cooling fluid within the coolant loop.

5. The fuel cell system according to claim 4 wherein the level sensing device includes a float, said float closing a port of the reservoir when the reservoir is completely filled with the cooling fluid and allowing gas to ventilate through the port when the level of the cooling fluid within the reservoir decreases.

6. The fuel cell system according to claim 4 wherein the level sensing device is an electrical switch device that opens a ventilation port of the reservoir in response to vehicle speed.

7. The fuel cell system according to claim 1 further comprising a compressor, said compressor providing compressed air to a cathode side of the fuel cell stack, wherein the compressor also provides the compressed air to the air side of the expansion device.

8. The fuel cell system according to claim 1 wherein the fuel cell system is on a vehicle.

9. A fuel cell system comprising:
   a fuel cell stack;
   a coolant loop providing a cooling fluid to the stack;
   a coolant loop pump for pumping the cooling fluid through the coolant loop and the fuel cell stack;
   an expansion device including a membrane, an air side on one side of the membrane and a cooling fluid side on an opposite side of the membrane, said cooling fluid side being in fluid communication with the coolant loop, wherein the membrane flexes in response to pressure changes of the cooling fluid within the coolant loop;
   a compressor for providing air to a cathode side of the fuel cell stack, wherein the compressor also provides compressed air to the air side of the expansion device, such that the pressure transfers from the air side of the expansion device to the cooling fluid side of the expansion device; and
   a valve positioned within a line between the compressor and the expansion device, said valve allowing the air side of the expansion device to be connected to an external line.

10. The fuel cell system according to claim 9 wherein the fuel cell system is on a vehicle.

* * * * *